United States Patent [19]

Lauridsen

[11] Patent Number: 5,014,998
[45] Date of Patent: May 14, 1991

[54] SHAFT SEAL

[75] Inventor: Kenneth W. Lauridsen, Lake Forest, Ill.

[73] Assignee: United Conveyor Corporation, Deerfield, Ill.

[21] Appl. No.: 501,324

[22] Filed: Mar. 26, 1990

Related U.S. Application Data

[63] Continuation of Ser. No. 173,762, Mar. 28, 1988, abandoned.

[51] Int. Cl.$^5$ .......................... F16J 15/10; F16J 15/18
[52] U.S. Cl. ........................................ 277/30; 277/97; 277/105; 277/135
[58] Field of Search .................. 277/30, 97, 98, 99, 277/105, 135, 212 F

[56] References Cited

U.S. PATENT DOCUMENTS

| | | | |
|---|---|---|---|
| 3,531,168 | 9/1970 | Bainard | 277/37 |
| 3,743,305 | 7/1973 | Berens et al. | 277/37 |
| 3,907,307 | 9/1975 | Maurer et al. | 277/124 |
| 3,988,026 | 10/1976 | Kemp, Jr. | 277/4 |
| 4,194,746 | 3/1980 | Stevens | 277/105 |
| 4,301,893 | 11/1981 | St. Jean et al. | 277/135 |
| 4,328,973 | 5/1982 | Delbridge | 277/85 |
| 4,498,681 | 2/1985 | Heinz | 277/139 |
| 4,582,329 | 4/1986 | Stalph | 277/106 |

Primary Examiner—William A. Cuchlinski, Jr.
Assistant Examiner—Scott Cummings
Attorney, Agent, or Firm—Wood, Phillips, Mason, Recktenwald & Van Santen

[57] ABSTRACT

A shaft seal for sealing a rotating shaft relative to a panel or wall of a device from which the shaft extends. The shaft seal has a tubular housing including a packing gland for shaft packings which is floatingly mounted to a wall or panel of the device by an annular diaphragm. A bushing in the bore of the tubular housing causes the tubular housing to move bodily as permitted by the floating mounting when shaft run-out occurs. A connection between the panel and the tubular housing limits its rotation thereof resulting from torsional forces derived from shaft rotation. A unitary structure fixed to the shaft for rotation therewith and mounted adjacent an outer end of the tubular housing coacts with an annular thrust washer fixed to said end of the tubular housing to absorb the loads applied to the annular diaphragm and tubular housing acting axially of the shaft. This unitary structure includes a collar fixed to the shaft, a thrust washer engaging the annular washer fixed to an end of the tubular housing and a resilient member bonded therebetween which exerts loading on the thrust washers.

10 Claims, 1 Drawing Sheet 5,014,998

SHAFT SEAL

DESCRIPTION

This application is a continuation of application Ser. No. 173,762, filed Mar. 28, 1988, now abandoned.

1. Field of the Invention

This invention pertains to a shaft seal to effect a seal between a rotatable shaft extending outwardly through a panel or wall of a machine or device and which is particularly suitable for sealing a shaft with shaft run-out resulting from loading imposed on the shaft within the machine or other sources of shaft misalignment.

2. Background of the Invention

Various types of shaft seals are known in the art, with a typical shaft seal being a conventional fibrous packing fitted in a bore of a packing gland fixed to a panel or wall of the equipment and engaging the rotatable shaft to effect the seal. In many instances, shaft loading can result in run-out, with the result that a slight amount of shaft orbiting within the fixed tubular housing results in destructive deformation of the packing.

This invention relates to an improvement over the prior art wherein a tubular housing including a packing gland which mounts the packing is mounted to the wall or panel by an annular, flexible member to seal the tubular housing to the panel and to enable orbiting of the tubular housing as may occur upon the existence of shaft run-out conditions. The tubular housing orbits with the shaft because of a shaft bushing fixed to an interior bore of the tubular housing. As a result, the packings remain in concentricity with the rotatable shaft and are not subject to destructive forces resulting from shaft run-out.

SUMMARY OF THE INVENTION

A primary feature of the invention is to provide a new and improved shaft seal for sealing a rotatable shaft which has a long service life because the mounting thereof overcomes problems resulting from shaft run-out.

The shaft seal is effective for sealing a rotating shaft relative to a panel or wall of a device and which has an opening through which the shaft extends. The shaft seal has a tubular housing having a bore and surrounding a section of the shaft, with shaft packing positioned in the bore, a shaft bushing is fixed in said bore in surrounding relation to the rotatable shaft and is effective to cause the tubular housing to have a slight orbit resulting from shaft run-out, and an annular, flexible member is connected between the wall or panel and an inner end of the tubular housing to seal the panel opening and to provide a floating support for the tubular housing to enable orbiting thereof.

Additionally, the shaft seal has means to limit rotational movement of the tubular housing as well as movement thereof axially on the shaft, with the latter limiting means being primarily usable when the machine or device from which the shaft extends has a chamber operating under pressure conditions sufficiently high to exert an outwardly-acting force on the annular member or if the shaft is not horizontal permitting gravity to apply an axial force.

An object of the invention is to provide a new and improved shaft seal wherein shaft sealing elements, such as packing, are not subject to damage resulting from shaft run-out and, therefore, the shaft seal has improved sealing capabilities and extended useful life.

Still another object of the invention is to provide a shaft seal for sealing a rotating shaft relative to a panel or wall of a machine from which the shaft extends comprising, a tubular housing surrounding a section of the shaft and having a packing gland with shaft packing, a shaft bushing fixed in a bore of the tubular housing, and annular means connectable between the tubular housing and said panel providing a floating support for the tubular housing and closing said opening.

Another object of the invention is to provide a shaft seal, as defined in the preceding paragraph, wherein the annular means comprises an annular diaphragm which floats the tubular housing and which enables the components to adjust for varying rates of thermal expansion when operating at relatively high temperatures and with there being means to limit rotational movement of the tubular housing resulting from torsional forces derived from shaft rotation acting on the annular diaphragm.

Still another object of the invention is to provide a shaft seal as defined in the preceding paragraphs wherein means are also provided to limit axial movement of the tubular housing in response to relatively high pressure conditions existing within the machine or other device from which the rotatable shaft extends and which exert outward force on the annular diaphragm, with said means comprising a unitary structure including a collar locked to the shaft, a thrust washer and a resilient member bonded therebetween, with the thrust washer abutting an annular thrust washer mounted to an end of the tubular housing.

Still another object of the invention is to provide a shaft seal for a rotatable shaft section extending outwardly of a machine through an opening in a panel or wall of the machine which is larger than the diameter of the shaft comprising, a tubular housing having a bore surrounding said shaft section and spaced therefrom, a first inner section of the tubular housing being defined by a packing gland and mounting shaft packing, a second outer section of the tubular housing being defined by a packing gland follower and having a tubular shaft bushing fixed within the bore and of a length whereby said shaft bushing and tubular housing are caused to orbit because of run-out of the shaft section, and an annular diaphragm connectable between the inner end of the tubular housing and the panel to close said panel opening and being of a flexible material to permit orbiting of the tubular housing and shaft section.

A further object of the invention is to provide a shaft seal as defined in the preceding paragraph wherein there are a plurality of said packings axially spaced along said rotatable shaft to define a space therebetween and an annular member is positioned in said space to provide a space which can be filled with grease from an external grease supply connection to provide a barrier to any material which might pass from the machine through the packing positioned nearest to the machine.

Other features and objects of the invention will be apparent from the following description of the preferred embodiment.

DESCRIPTION OF THE PREFERRED EMBODIMENT

Figure 1:
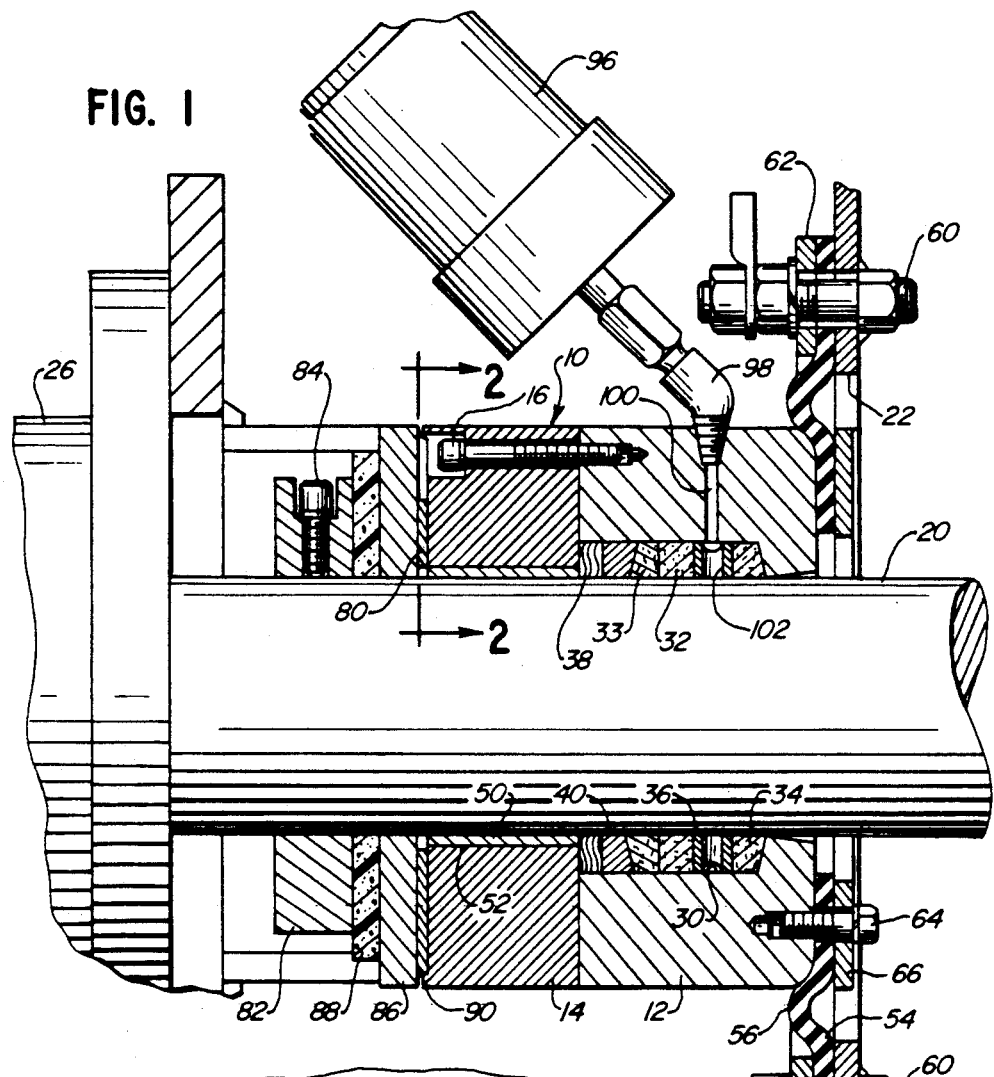
FIG. 1 is a central vertical section of the shaft seal shown in association with a portion of a machine and a rotatable shaft extending therefrom.

The shaft seal has a unitary, tubular housing, indicated generally at 10, composed of a packing gland 12 and a packing gland follower 14 which are held in assembled relation by a plurality of screws 16.

The shaft seal 10 coacts with a rotatable shaft 20 extending out through an opening 22 in a panel or wall 24 of a machine or device. The rotatable shaft 20 has an outboard end supported by a bearing 26.

The packing gland 12 of the tubular housing has a bore with a recessed section 30 which mounts shaft packing including packing rings 32, 33 and 34 with packing rings 32 and 34 spaced apart axially of the rotatable shaft 20. An annular lantern ring 36 is positioned in the space and these components are placed in compression by spring elements 38 which act against a spacer 40 and with the right-hand packing ring abutting against a wall of the recess. The spring elements 38 abut a wall surface of the packing gland follower 14.

A tubular bushing 50 of rigid, low friction material is fixed to a bore 52 of the packing gland follower 14. The tubular bushing 50 has sufficient length to assure constant concentricity of the tubular housing 10 relative to the rotatable shaft 20.

The rotatable shaft 20 can be subject to loading within the machine or device from which it extends which results in shaft run-out and resulting orbiting of the tubular housing and shaft section associated therewith relative to an axis of rotation for the rotatable shaft when it is at rest. The term "orbit" as used herein, including the claims, is used in that sense. Since the tubular housing 10 follows the motion of the rotatable shaft section resulting from shaft run-out, there are no eccentric loads placed on the shaft packing which would reduce the wear life of the shaft packings.

The use of the tubular bushing 50 and associated structure immunizes the shaft packings from problems which could arise from shaft run-out.

Means, in the form of an annular diaphragm 54 provides a floating mounting for the tubular housing 10 so that it may orbit to conform to shaft run-out and also seals the opening 22 in the panel 24. The annular diaphragm 54 is made of a flexible material and is mounted with an annular bend 56 to assist in the floating mounting of the tubular housing. The annular diaphragm 54 is secured adjacent its outer periphery to the wall panel 24 by a screw and nut structure 60 and a clamping ring 62. The annular diaphragm is mounted to the packing gland 12 of the tubular housing adjacent its inner periphery by screw means 64 threaded into the packing gland 12 and by use of a second clamping ring 66.

The annular diaphragm is formed of a flexible material with resistance to torsion forces applied thereto. Many different materials would be suitable, with an example of one material being a silicone material. Distortion of the annular diaphragm 54 resulting from torsion forces applied thereto is limited by a flexible wire element 70 which extends between a connection to the screw and nut structure 60 and a bracket 72 fixed to the tubular housing (FIG. 2).

Figure 2:
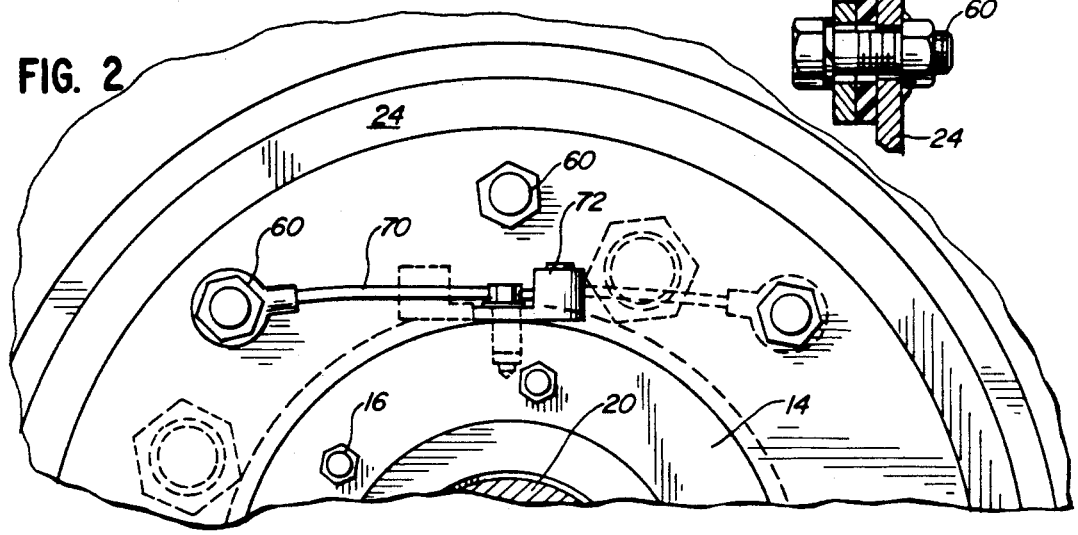
FIG. 2 is a fragmentary elevational view, taken generally along the line 2—2 in FIG. 1.

With the shaft 20 rotating in a clockwise direction, as viewed in FIG. 2, the torsional forces act in a direction to be resisted by the wire element 70. A reversed connection is shown in broken line for counterclockwise shaft rotation.

When relatively high pressure conditions exist within the machine or device from which the rotatable shaft 20 extends, there can be a resulting force tending to move the annular diaphragm 54 and the tubular housing 10 away from the panel opening 22. Under such conditions, the shaft seal has means for limiting outward movement of the tubular housing and annular diaphragm 54 relative to the panel 24. This means comprises an annular rigid, low friction thrust washer 80 fixed to an outer end face of the packing gland follower 14 of the tubular housing and a unitary structure rotatable with the shaft. The unitary structure includes a collar 82 fixed to the rotatable shaft by a plurality of threaded members 84 and a thrust washer 86 of metallic material with a resilient member 88 bonded therebetween and exerting loading of the thrust washer 86 against the annular washer 80. Preferably, the collar 82 is a split collar with the collar sections drawn tightly onto the shaft. The component dimensions are selected so that a peripheral lip 90 of the packing gland follower 14 is not in contact with the thrust washer 86. The unitary structure fixed to the shaft 20 absorbs axial loads imparted to the annular diaphragm and the tubular housing.

Certain types of machines with which this shaft seal may be used may involve generation or handling of particulate material and it is important that the outward travel of such material along the shaft be limited and, at most, only reach the shaft packing 34. In order to provide a barrier against further travel of such particulate material, the lantern ring in the space between the shaft packings functions to maintain the spacing and provides a barrier to further travel of the particulate material by the use of grease supplied from an external container 96. This external container has a connection 98 to the packing gland 12 and a passage 100 communicates with the space containing the lantern ring. The lantern ring has a series of radial passages 102 therethrough to enable grease to flow to the inner periphery of the lantern ring to provide a seal at the shaft interface and the external periphery of the lantern ring is concave to enable maintenance of a grease barrier at the outer periphery.

In summary, the annular diaphragm 54 provides a floating mounting for the tubular housing 10 whereby the tubular housing can and will follow the shaft run-out movement because of the coaction between the tubular bushing 50 and the shaft. The shaft packings are immunized from any deleterious effects from shaft run-out because of the packings orbiting with the shaft. Additionally, the annular diaphragm 54 enables variable growth of components resulting from thermal expansion when operating under high temperature conditions.

I claim:

1. A shaft seal for sealing a rotating shaft subject to shaft run-out relative to a panel having an opening through which the shaft extends and with the opening having a size greater than the diameter of the shaft comprising, a tubular housing surrounding a section of the shaft and having a packing gland with shaft packing, a shaft bushing fixed in a bore of the tubular housing for causing said tubular housing to orbit slightly as shaft rut-out occurs, and annular flexible means connectable between the tubular housing and said panel spanning said opening and providing a floating support for the tubular housing and closing said opening.

2. A shaft seal as defined in claim 1 including means for limiting axial movement of the tubular housing relative to said shaft.

3. A shaft seal for a rotatable shaft section extending outwardly of a machine through an opening in a panel of the machine which is larger than the diameter of the shaft to suable shaft run-out comprising, a tubular housing having a bore surrounding said shaft section and spaced therefrom, a first inner section of the tubular housing being defined by a packing gland and mounting shaft packing, a second outer section of the tubular housing being defined by a packing gland follower and having a tubular shaft bushing fixed within the bore and of a length whereby said shaft bushing and tubular housing are caused to orbit slightly because of run-out of the shaft section, and an annular diaphragm connectable between the inner end of the tubular housing and the panel and spanning and closing said panel opening and being of a flexible material to permit orbiting of the tubular housing and shaft section.

4. A shaft seal as defined in claim 3 including means to limit rotation of the tubular housing relative to the panel.

5. A shaft seal as defined in claim 4 wherein the rotation-limiting means comprises a wire element connected between the panel and the tubular housing.

6. A shaft seal as defined in claim 3 wherein said shaft packing includes at least a pair of axially spaced-apart annular packing rings, means positioned in the space between the packing rings to maintain said spacing, and means for supplying grease to said space from an external source in order to provide a grease barrier at the outer periphery of the rotatable shaft and the inner periphery of the packing gland bore.

7. A shaft seal for sealing a rotating shaft subject to shaft run-out relative to a panel having an opening through which the shaft extends and with the opening having a size greater than the diameter of the shaft comprising, a tubular housing surrounding a section of the shaft and having a packing gland with shaft packing, a shaft bushing fixed in a bore of the tubular housing for causing said tubular housing to orbit slightly as shaft run-out occurs, annular flexible means connectable between the tubular housing and said panel providing a floating support for the tubular housing and closing said opening, a thrust washer on an end of said tubular housing, and a unitary structure fixed to said rotatable shaft beyond said end of the tubular housing and including a thrust washer resiliently urged against said thrust washer on the end of the tubular housing.

8. A shaft seal as defined in claim 7 wherein said unitary structure includes a collar attached to the rotatable shaft and a resilient member bonded between the collar and the thrust washer of the unitary structure.

9. A shaft seal for sealing a rotating shaft subject to shaft run-out relative to a panel having an opening through which the shaft extends and with the opening having a size greater than the diameter of the shaft comprising, a tubular housing surrounding a section of the shaft and having a packing gland with shaft packing, a shaft bushing fixed in a bore of the tubular housing for causing said tubular housing to orbit slightly as shaft run-out occurs, annular flexible means connectable between the tubular housing and said panel providing a floating support for the tubular housing and closing said opening, means limiting flexure of the annular means in response to tortional force resulting from shaft rotation.

10. A shaft seal for sealing a rotating shaft subject to shaft run-out relative to a panel having an opening through which the shaft extends and with the opening having a size greater than the diameter of the shaft comprising, a tubular housing surrounding a section of the shaft and having a packing gland with shaft packing, a shaft bushing fixed in a bore of the tubular housing for causing said tubular housing to orbit slightly as shaft run-out occurs, annular flexible means connectable between the tubular housing and said panel providing a floating support for the tubular housing and closing said opening, and means for limiting flexure of the annular means in response to either rotation or axial movement of said shaft.

* * * * *